March 25, 1958   J. J. SUOZZI   2,828,420
MAGNETIC TRIPLER POWER FACTOR CORRECTION
Filed June 18, 1956

(a)

(b)

(c)

INVENTOR
J. J. SUOZZI

BY

ATTORNEYS 2,828,420
Patented Mar. 25, 1958

2,828,420

MAGNETIC TRIPLER POWER FACTOR CORRECTION

Joseph J. Suozzi, Morristown, N. J., assignor to the United States of America as represented by the Secretary of the Navy Application June 18, 1956, Serial No. 592,222

18 Claims. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

The present invention relates to circuit means for correcting the power factor of a magnetic tripler and more particularly to circuit means for obtaining unity power factor in a single-phase, magnetic bridge frequency tripler.

In U. S. Patent No. 1,678,965 to O. Von Bronk, there is disclosed and described a bridge-type, single-phase, magnetic frequency tripler. Although satisfactory for general applications, this tripler is characterized by a power factor of about .2 to .3, which is undesirable in many electrical applications. Heretofore, this power factor characteristic of Von Bronk's tripler has been disregarded in systems in which power factor consideration was of little or no significance; and, in systems requiring unity power factor the utilization of other types of triplers, of more complicated construction, has been resorted to. Due to its ruggedness, dependability, and maintenance-free-long-life, the use of Von Bronk's tripler is preferred wherever possible.

The general purpose of this invention is to provide circuit means in conjunction with Von Bronk's tripler to enable the attainment of unity power factor therein whereby more widespread utilization of this tripler is feasible.

In accordance with the present invention, unity power factor is obtained in Von Bronk's magnetic bridge tripler by the combination of a reactance element connected across the input terminals of the bridge and a reactance network in series with the bridge, the parameters of the reactance element and the reactance network being such that the reactance element and bridge form a tuned circuit tuned to the harmonic frequency generated by the bridge and that the combination of the reactance network with the reactance element and bridge form a tuned circuit tuned to the fundamental frequency of the generated harmonic frequency.

A primary object of the present invention is to provide a magnetic bridge-type harmonic generator having unity power factor.

Another object is to correct to unity the power factor of a static frequency multiplier.

A further object is to provide a magnetic bridge frequency tripler circuit having unity power factor.

A still further object is the provision of a single-phase magnetic bridge frequency tripler having unity power factor.

Another further object is the provision of circuit means interposed between a harmonic generator and a fundamental frequency source, the circuit means being of such character that the current supplied to the generator is fundamental and in phase with the line voltage of the source.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
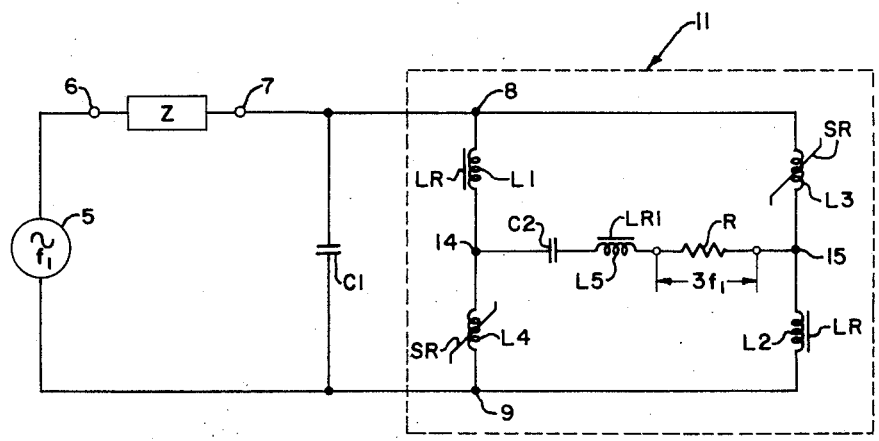
Fig. 1 is a schematic wiring diagram of the invention.

Referring now to the drawings, there is shown an A. C. source of predetermined frequency $f_1$ for energizing a conventional single-phase, magnetic bridge frequency tripler, denoted generally at 11, which includes a pair of inductances, L1 and L2, wound on a common linear reactor core LR to form a pair of opposing legs of the bridge, a pair of inductances, L3 and L4, wound on a saturable reactor core SR to form the other pair of opposing legs of the bridge, and a series load circuit connected across output terminals 14 and 15 of the bridge, the load circuit including a load resistor R in series with an inductance L5 wound on linear reactor core LR1 and a capacitor C2. The output appearing across resistor R is the third harmonic $3f_1$ of the frequency $f_1$ of the supply source 5. Inductance L5 and capacitor C2, forming a series tuned L–C circuit tuned to the third harmonic $3f_1$, serve as a smoothing filter network. For a more complete description of the magnetic bridge tripler 11, reference is made to U. S. Patent No. 1,678,965 to Von Bronk wherein is disclosed a similar magnetic bridge tripler.

Figure 2:
Fig. 2 illustrates the various reactance elements which may be employed as the reactance network in Fig. 1.
Figure 2:
Figure 2:
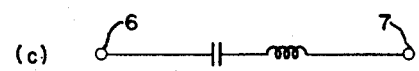

A capacitor C1 is connected across the input terminals, 8 and 9, of the bridge to form a tuned network with bridge 11, the reactance value of capacitor C1 being so selected that the tuned network is tuned to the third harmonic $3f_1$ A reactance impedance Z, such as either an inductance, or capacitor or inductance and capacitor in series as shown in Figs. 2[a], 2[b] and 2[c] respectively, is connected between terminals 6 and 7 in series with bridge 11 across the source 5. The reactance value of impedance Z is selected so as to form a tuned circuit with the parallel reactance presented by the bridge 11 and capacitor C1, which tuned circuit is tuned substantially to the frequency $f_1$ of the source 5.

In operation, the series impedance Z blocks any high frequencies appearing in the bridge 11 from a reflecting back into source 5, while capacitor C1 shunts the higher frequencies appearing in bridge 11. In this manner, the current applied to the bridge tripler 11 can be fundamental and in phase with the line voltage supplied by source 5.

From the foregoing, it is apparent that the present invention provides a circuit arrangement whereby unity power factor is obtained in a magnetic bridge frequency tripler.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination with a magnetic bridge harmonic-developing circuit of predetermined reactance characteristic and having a pair of input terminals energized from an alternating current source of predetermined frequency and a pair of output terminals bridged by a load circuit in which appears the developed harmonic of said predetermined frequency, power factor correction means comprising a first reactive circuit connected across said input terminals to form with said bridge a first tuned network tuned to said developed harmonic, and a second reactive circuit serially connecting said input terminals to the source of predetermined frequency, said second reactive circuit with said first tuned network forming a second network tuned to said predetermined frequency.

2. The combination of claim 1, wherein said first reactive circuit includes a capacitor.

3. The combination of claim 2, wherein said second reactive circuit includes a capacitor.

4. The combination of claim 2, wherein said second reactive circuit includes an inductance.

5. The combination of claim 2, wherein said second reactive circuit consists of a capacitor and inductance connected in series.

6. A harmonic generator having power factor correcting means, comprising a four-cornered bridge type multiplier circuit having inherent reactance characteristics, a load circuit connected across an opposite pair of corners of said bridge circuit, the generated harmonic appearing in said load circuit, an alternating current supply source of fundamental frequency, a reactive component of a preselected reactance value connected across the other opposite pair of corners of said bridge circuit to form a first tuned network with said bridge circuit, said tuned network being tuned to the generated harmonic of said predetermined frequency, and reactive impedance means serially connecting said other opposite pair of corners across said source, said reactive means with said first network forming a second network tuned to said fundamental frequency.

7. A harmonic generator having power factor correcting means, comprising a four-cornered bridge type tripler circuit having inherent reactance characteristics, a load circuit connected across an opposite pair of corners of said bridge circuit, an alternating current supply source of predetermined frequency, a reactive component of a preselected reactance value connected across the other opposite pair of corners of said bridge circuit to form a first tuned network with said bridge circuit, said tuned network being tuned to the third harmonic of said predetermined frequency, and reactive impedance means serially connecting said other opposite pair of corners across said source, said reactive means with said first network forming a second network tuned to said predetermined frequency.

8. A harmonic generator having power factor correcting means, comprising a four-cornered bridge type magnetic tripler circuit having inherent reactance characteristics and adapted to produce the third harmonic of a fundamental frequency, a load circuit connected across an opposite pair of corners of said bridge circuit to receive said third harmonic, an alternating current supply source of fundamental frequency, a capacitor of a preselected reactance value connected across the other opposite pair of corners of said bridge circuit to form a first tuned network with said bridge circuit, said tuned network being tuned to said third harmonic, and reactive impedance means serially connecting said other opposite pair of corners across said source, said reactive means with said first network forming a second network tuned to said fundamental frequency.

9. The generator of claim 8, wherein said reactive impedance means is a capacitor.

10. The generator of claim 8, wherein said reactive impedance means is an inductance.

11. The generator of claim 8, wherein said reactive impedance means consists of an inductance and a capacitor connected in series.

12. In combination, a harmonic generator, an alternating current source for supplying a fundamental frequency current, and a reactive circuit intercoupling said generator for energization from said source, said reactive circuit being characterized by parameters such as to maintain the current flowing therethrough from said source in in-phase relationship with the line voltage thereof.

13. In combination, a harmonic generator, an alternating current source for supplying a fundamental frequency current, and a reactive circuit interconnecting said generator with said source, said reactive circuit including reactance elements connected in discrete relationship with respect to said generator and being of such parameters as to maintain the current flowing through said reactive circuit from said source in in-phase relationship with the line voltage thereof.

14. In combination, a harmonic generator, an alternating current source for supplying a fundamental frequency current, and a reactive circuit interconnecting said generator with said source, said reactive circuit including reactance elements connected in closed series circuit relationship with said source and being of such parameters as to maintain the current flowing through said reactive circuit in in-phase relationship with the line voltage thereof.

15. The combination of a predominantly inductive frequency multiplier energized from a power source of fundamental frequency current through a reactive translating circuit which maintains said energizing current in in-phase relationship with the line voltage of said source, whereby the combination is characterized by unity power factor.

16. The combination of a predominantly inductive frequency multiplier energized from a power source of fundamental frequency current through a reactive translating circuit which maintains said energizing current in in-phase relationship with the line voltage of said source, said reactive circuit with said multiplier forming a first tuned circuit resonant at the fundamental frequency of said source, and a portion of said reactive circuit with said multiplier forming a second tuned circuit resonant at the frequency produced by said multiplier.

17. In combination with a frequency changing circuit connected to be energized from an alternating current source of predetermined frequency and utilizing reactor core means for producing a harmonic of said predetermined frequency in an output circuit coupled to said core means, power factor correction means comprising a reactive circuit interposed between said source and core means and forming with said core means a first tuned circuit resonant at said predetermined frequency, a portion of said reactive circuit being operatively associated with said core means to form therewith a second tuned circuit resonant at the frequency of said harmonic.

18. A harmonic generator arrangement having unit power factor comprising, in combination, a source of alternating current of fundamental frequency, a frequency multiplier of predominantly inductive characteristic for producing a predetermined harmonic of said fundamental frequency, a first reactance means in parallel with said multiplier forming a tuned circuit therewith which is resonant at the frequency of said harmonic, and a second reactance means serially connecting said multiplier to said source, said second reactance means in combination with said first reactance means and said multiplier forming a tuned circuit resonant at said fundamental frequency.

References Cited in the file of this patent

UNITED STATES PATENTS

| | | |
|---|---|---|
| 1,885,728 | Keith | Nov. 1, 1932 |
| 2,418,641 | Huge | Apr. 8, 1947 |

FOREIGN PATENTS

| | | |
|---|---|---|
| 516,844 | Great Britain | Jan. 12, 1940 |